United States Patent
Lee et al.

(10) Patent No.: US 9,794,843 B2
(45) Date of Patent: Oct. 17, 2017

(54) METHOD AND APPARATUS FOR HANDOVER BETWEEN CONTENT SERVERS FOR TRANSMISSION PATH OPTIMIZATION

(71) Applicant: Samsung Electronics Co., Ltd., Gyeonggi-do (KR)

(72) Inventors: Jin-Sung Lee, Seoul (KR); Ki-Suk Kweon, Gyeonggi-do (KR); Jung-Shin Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/664,140

(22) Filed: Mar. 20, 2015

(65) Prior Publication Data

US 2015/0271725 A1    Sep. 24, 2015

(30) Foreign Application Priority Data

Mar. 24, 2014    (KR) .................. 10-2014-0033999

(51) Int. Cl.
| | |
|---|---|
| *H04W 88/08* | (2009.01) |
| *H04W 36/08* | (2009.01) |
| *H04W 36/00* | (2009.01) |
| *H04W 36/32* | (2009.01) |
| *H04W 76/02* | (2009.01) |
| *H04L 29/08* | (2006.01) |

(52) U.S. Cl.
CPC .......... *H04W 36/08* (2013.01); *H04L 67/148* (2013.01); *H04L 67/2842* (2013.01); *H04W 36/0005* (2013.01); *H04W 36/32* (2013.01); *H04W 76/022* (2013.01); *H04W 36/0033* (2013.01); *H04W 88/08* (2013.01)

(58) Field of Classification Search
CPC ..................................... H04W 36/08
USPC ............................................. 455/436
See application file for complete search history.

(56) References Cited

U.S. PATENT DOCUMENTS

| | | | |
|---|---|---|---|
| 2010/0306304 A1* | 12/2010 | Cao ................ | H04W 36/0011 709/203 |
| 2011/0107364 A1 | 5/2011 | Lajoie et al. | |
| 2011/0265174 A1 | 10/2011 | Thornton et al. | |
| 2012/0020284 A1* | 1/2012 | Haddad ................ | H04L 29/06 370/328 |
| 2013/0029708 A1* | 1/2013 | Fox ..................... | H04W 28/08 455/509 |

(Continued)

FOREIGN PATENT DOCUMENTS

| | | |
|---|---|---|
| EP | 1 331 791 | 7/2003 |
| EP | 1654650 | 5/2006 |

(Continued)

OTHER PUBLICATIONS

European Search Report dated Aug. 7, 2015 issued in counterpart application No. 15160599.5-1854, 8 pages.

*Primary Examiner* — Qutbuddin Ghulamali
(74) *Attorney, Agent, or Firm* — The Farrell Law Firm, P.C.

(57) ABSTRACT

A method of an electronic device in a wireless communication system is provided. The method includes receiving, by the electronic device, a service through a first content server, performing, by the electronic device, handover from a serving Base Station (BS) to a target BS, and continuously receiving the service through a second content server closest to the electronic device.

14 Claims, 17 Drawing Sheets

(56) References Cited

U.S. PATENT DOCUMENTS

2014/0113637 A1\* 4/2014 Guan .................. H04W 8/082
                                                                                  455/437

FOREIGN PATENT DOCUMENTS

| EP | 2 538 719 | 12/2012 |
|---|---|---|
| WO | WO 2012/080901 | 6/2012 |

\* cited by examiner

METHOD AND APPARATUS FOR HANDOVER BETWEEN CONTENT SERVERS FOR TRANSMISSION PATH OPTIMIZATION

PRIORITY

This application claims priority under 35 U.S.C. §119(a) to a Korean Patent Application filed in the Korean Intellectual Property Office on Mar. 24, 2014 and assigned Serial No. 10-2014-0033999, the entire content of which is incorporated herein by reference.

BACKGROUND OF THE INVENTION

1. Field of the Invention

The present invention relates generally to handover, and more particularly, to a method and apparatus for handover between content servers.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are discussed in 5G communication systems.

In addition, in 5G communication systems, development for system network improvement is underway based on advanced small cells, cloud Radio Access Networks (RANs), ultra-dense networks, Device-to-Device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and Sliding Window Superposition Coding (SWSC) as an Advanced Coding Modulation (ACM), and Filter Bank Multi Carrier (FBMC), Non-Orthogonal Multiple Access (NOMA), and Sparse Code Multiple Access (SCMA) as an advanced access technology have been developed.

Recently, electronic devices have been used to provide users with various forms of multimedia services. For example, after accessing an Internet Protocol (IP) based network, such as the Internet, through electronic devices, the users can be provided with, not only texts and images from a service provider, but can also be provided with various multimedia services, such as a video phone service, a multimedia messaging service, a contents service, a broadcasting service, a game service, and a chatting service.

Some electronic devices guarantee mobility, in order to provide users with the multimedia services at any location while moving. Electronic devices guaranteeing mobility in this manner are called mobile devices. For example, electronic devices, such as smart phones, tablet Personal Computers (PCs), Personal Digital Assistants (PDAs), notebooks, digital cameras, etc., have a function of wirelessly accessing an IP-based network, such as the Internet.

Meantime, when users are provided with the multimedia services through electronic devices, the users can be provided with the multimedia services only through a single accessed network. For example, some the electronic devices can access a $3^{rd}$ Generation (3G) network or a $4^{th}$ Generation Long Term Evolution (4G LTE) network, and receive the multimedia services from the 3G network or the 4G LTE network.

As an alternative, the electronic devices can access a Wireless Local Area Network (WLAN) such as Wireless Fidelity (WiFi), and receive the multimedia services from the WLAN. Some electronic devices can gain access to a wireless network, such as Worldwide Interoperability for Microwave Access (WiMax), and receive the multimedia services from the wireless network.

Electronic devices can access a Content Delivery Network (CDN), and download contents from the CDN. A CDN is a network for efficiently delivering contents in order to offload traffic from an Internet backbone network or provide a fast response time to an electronic device.

An electronic device can create a session with a content server, and can download contents from the content server while performing handover from a legacy Base Station (BS) (i.e., an Access Router (AR)) to a new BS. To prevent a data loss and disconnection of the session for contents downloading during the handover, an IP address of the electronic device must be maintained without being changed. Herein, a BS can correspond to any access nodes having a gateway function. The following example assumes that the BS represents an access router of the Internet Engineering Task Force Distributed Mobility Management Working Group (IETF DMM WG), but the BS can be also a Local Gateway (LGW) of $3^{rd}$ Generation Partnership Project (3GPP).

If a Proxy Mobile Internet Protocol (PMIP) is used, when an electronic device moves to a new BS, the new BS, in place of the electronic device, sends a Proxy Binding Update (PBU) message to a legacy BS and notifies the legacy BS of a location of the electronic device.

In a response to the received PBU message, the legacy BS sends a Proxy Binding Acknowledgement (PBA) message to the new BS, thereby creating a tunnel between the legacy BS and the new BS.

Packets destined from the content server to the electronic device are forwarded from the legacy BS to the new BS through a tunnel created between the legacy BS and the new BS. The packets are again forwarded from the new BS to the electronic device.

Accordingly, though performing handover, the electronic device can still maintain a legacy session and continuously download contents. More specifically, when the electronic device performs a handover, packet transmission is achieved through the tunnel created between the BSs in order to maintain a continuity of the legacy session.

If a new content server closer to the new BS exists, it is possible to setup a closer transmission path than a transmission path of forwarding the packets through the tunnel between the BSs.

However, because the present time maintains the legacy session as it is after the handover, it is impossible to perform contents downloading using the new content server and the closer transmission path.

SUMMARY OF THE INVENTION

Accordingly, the present invention has been made to address at least the problems and/or disadvantages described above and to provide at least the advantages described below.

Accordingly, an aspect of the present invention is to provide a method and apparatus for handover between content servers for transmission path optimization.

Another aspect of the present invention are to provide a method and apparatus for, when an electronic device performs handover with maintaining a session with a content server, if a new content server closer than the legacy content server exists, guaranteeing a continuity of the session while continuously downloading contents from the new content server, thereby maintaining the shortest optimal transmission path between the content server and the moving electronic device all the time.

According to an aspect of the present invention, a method of an electronic device in a wireless communication system is provided. The method includes receiving, by the electronic device, a service through a first content server, performing, by the electronic device, handover from a serving Base Station (BS) to a target BS, and continuously receiving the service through a second content server closest to the electronic device.

According to another aspect of the present invention, an electronic device of a wireless communication system is provided. The device includes a communication interface for receiving a service through a content server, and a processor configured to, when performing handover from a serving BS to a target BS in while receiving a service through a first content server, control continuous receipt of the service through a second content server closest to the electronic device.

BRIEF DESCRIPTION OF THE DRAWINGS

The above and other aspects, features, and advantages certain embodiments of the present invention will be more apparent from the following detailed description when taken in conjunction with the accompanying drawings, in which.

DETAILED DESCRIPTION OF EMBODIMENTS OF THE PRESENT INVENTION

Figure 1:
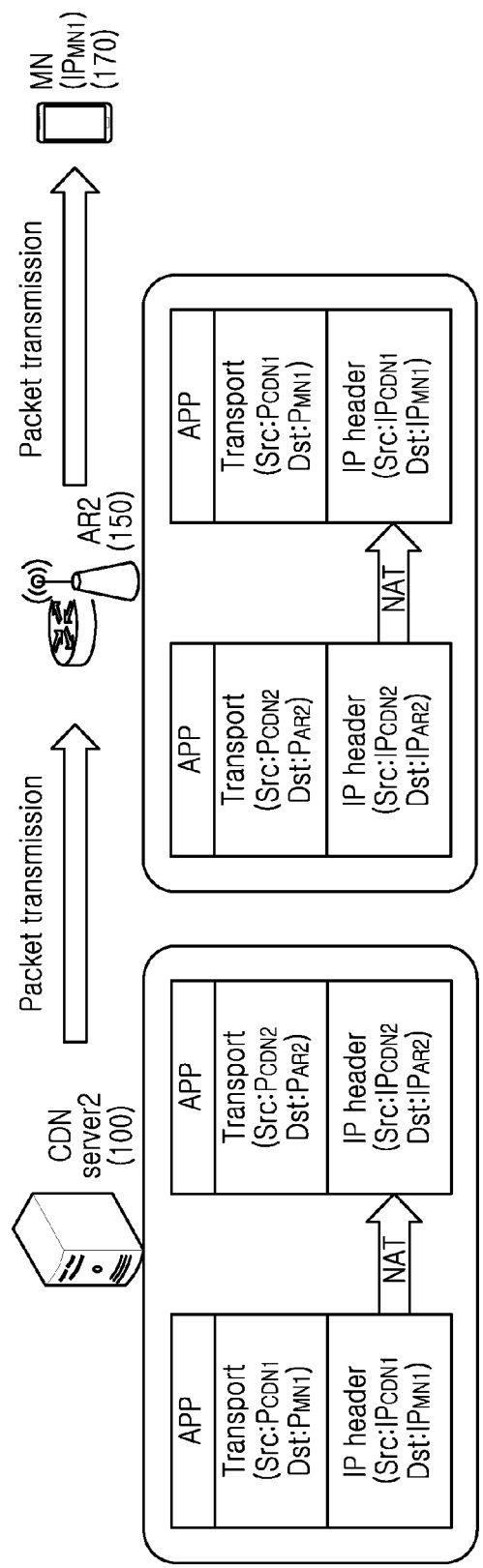
FIG. 1 is a diagram illustrating a Network Address Translation (NAT) based data path setup process according to an embodiment of the present invention.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness. In the following description the same or similar reference numerals may be used to refer to the same or similar elements.

In the following description of various embodiments of the present invention, a multimedia service refers to a service provided by a service provider when a user executes a specific application (or App) in an electronic device, and multimedia service data refers to data provided by the service provider. Herein, the multimedia service data may be referred to as 'contents', 'content', and the like. A multimedia service may include, for example a text and image provision service, a video phone service, a multimedia messaging service, a contents service, a broadcasting service, a game service, and a chatting service, but may also include various services not referred. Such a multimedia service may be provided by the service provider having accessed an IP based network such as the Internet when the user executes an application related to the multimedia service in the electronic device.

Various embodiments of the present invention may be applied to electronic devices of various forms, but the following description refers to mobile devices, such as smart phones, as non-limiting examples of electronic devices according to embodiments of the present invention. The term 'user' as used herein, may be used to denote a person who uses an electronic device or a device (e.g., an artificial intelligence electronic device) that uses an electronic device.

As cellular networks and smart phones are developed, more contents are provided to smart phones. With respect to video contents, for example, high-quality videos may include hundreds of MegaBytes (MBytes), and may require dozens of MegaBits Per Second (Mbps). Some mobile devices access a network through a plurality of R Access Technologies (RATs). For example, some mobile devices include a WiFi interface. Through the WiFi interface, mobile devices may access a Wireless Local Area Network (WLAN). Mobile devices may also include a cellular interface. Through the cellular interface, mobile devices may access a $3^{rd}$-Generation (3G) or Long Term Evolution (LTE) network. Some devices may also include many other interfaces, such as WiMax and the like.

A Content Delivery Network (CDN) is a network for efficiently delivering contents in order to offload traffic from an Internet backbone network or provide a fast response time to an electronic device.

Basically, if an electronic device accesses a specific content server, the electronic device acquires homepage information including a Uniform Resource Locator (URL) of contents from the content server. At this time, if the electronic device clicks specific contents, the electronic device sends, to a Domain Name System (DNS) server, a request for an IP address for a domain name existing in a URL of the specific contents.

The DNS server provides an IP address of a content server closest to the electronic device, thereby allowing the electronic device to create a session with the closest content server and download the corresponding contents from the closest content server.

Recently, CDN service providing companies (e.g., Akamai) have been creating strategic partnerships with worldwide major mobile communication companies (e.g., AT&T, Orange, KT and the like) and installing CDN servers in mobile communication networks. Accordingly, in the future, when $5^{th}$-Generation (5G) communications are used, there is a very high possibility that content servers and mobile communication networks will be closely connected with each other.

A series of processes according to an embodiment of the present invention is described as follows. The first process includes performing session identification with a content server and information acquisition. In order to download specific contents, an electronic device performs a preceding process of sending a request to a DNS server (i.e., a DNS query) and acquiring an IP address of a content server having the corresponding contents. At this time, the electronic device directly identifies, through Deep Packet Inspection (DPI), a session with the content server which is installed by a mobile operator. Alternately, a serving Base Station (BS) servicing the electronic device checks the IP address of the content server through the DPI and identifies the session with the content server. Regarding this identified session, the electronic device or the serving BS stores a domain name of the content server and an IP address thereof. This information is used later in a DNS lookup process for finding a new content server when the electronic device performs handover.

The second process includes reselecting the closest content server. If the electronic device is moved, a content server may be reselected according to the following methods. A first reselection method is a method of, after the electronic device performs handover to a new BS, directly finding a closer content server through DNS lookup. A second reselection method is a method using signaling between BSs as follows. A source BS (i.e., a source AR (AR 1)) transmits a HandOver request message (HO request) to a target BS (i.e., a target AR (AR 2)). At this time, the source BS transmits a domain name and an IP address being information acquired from session identification, to the target BS, together. If the target BS receives the handover request message from the source BS, the target BS performs a DNS lookup procedure together with a handover execution procedure. The target BS checks whether a new content server exists through a DNS server. If a new content server exists, the target BS acquires an IP address of the new content server.

The third process is a session context transfer process. Through the aforementioned DNS lookup process, the new content server initiates communication with a legacy content server. More specifically, the new content server transmits a content check and session context transfer request message to the legacy content server (i.e., a content check trigger). Upon receiving the message, the legacy content server checks whether contents that the electronic device is currently downloading exist in the new content server. If the contents that are being downloaded from the legacy content server exist in the new content server, the legacy content server delivers, to the new content server, information about a session previously connected with the electronic device. At this time, context information to be delivered are an IP address of the content server constructing the session, a Transmission Control Protocol (TCP) session context, which is transport layer context information, and a contents session context, which is application layer context information. The context information is given as in Table 1 below.

TABLE 1

| Layer division | Context information to be delivered |
|---|---|
| Application layer context info. | Content ID<br>Resuming point of content<br>e.g. page number, playing time, and so on |
| Transport layer context info. | 5-tuple for socket identification<br>(src(source) IP, src port, dst(destination) IP, dst port, protocol ID)<br>Sending side for TCP<br>(Sequence number of the next byte to be acknowledged, Sequence number of the next byte to be sent, Sending windows) |
| Network layer context info. | IP addresses of the old CDN server and the MN |

The fourth process is a data path setup process. As described above, a session is created between the new content server and the electronic device, based on the session context delivered. Through this session, downloading of existing contents is resumed through a new path. When the electronic device directly takes part in performing the handover, the electronic device directly exchanges signaling for setting a tunnel with the new content server. Accordingly, the contents downloading through the legacy session may be maintained. By contrast, when handover is performed by a BS, a path setup operation based on Network Address Translation (NAT), or tunneling is carried out between the new content server and the target BS, such that a new session between the new content server and the electronic device connected through the target BS can be recognized as corresponding to the legacy session.

Through the aforementioned processes, all preparation processes for data path setup are completed. Several operations according to the data path setup are each described below. In the following description, an electronic device may be referred to as an MN, and a CDN server may be called a CDN or a content server.

FIG. 1 is a diagram illustrating a NAT based data path setup process according to an embodiment of the present invention.

Referring to FIG. 1, a NAT based data path setup process according to an embodiment of the present invention includes a non-intervening (i.e., MN-transparent) handover of MNs between content servers. In FIG. 1, NAT technology is used as a method for preventing an MN 170 from recognizing that a CDN server has changed.

The NAT technology is a technology required for, when creating a session in a new CDN server (CDN server 2) 100, transmitting a packet to a target BS (AR2) 150 through IP address based routing. The NAT technology includes of a process of changing an IP address and a port number in the CDN server 2 100 and transmitting a packet to the AR2 150, and a process of changing an IP address and a port number in the AR2 150, so as to restore the original IP packet, and transmitting the original IP packet to the MN 170.

That is, the CDN server 2 100 performs address translation from an IP packet destined from a src (source) $IP_{CDN1}$ to a dst (destination) $IP_{MN1}$ to an IP packet destined from a src (source) $IP_{CDN2}$ to a dst (destination) $IP_{AR2}$, such that the AR2 can receive the address-translated IP packet. The AR2 150 again performs address translation from the IP packet destined from $IP_{CDN2}$ to $IP_{AR2}$ to the IP packet destined from $IP_{CDN1}$ to $IP_{MN1}$. Also, if there is a plurality of download flows from the same CDN server to a single MN, these flows are distinguished through port numbers existing in headers of transport layers. Here, $IP_{CDN1}$ represents an IP address, and $P_{cDN1}$ represents a port number.

Figure 2:
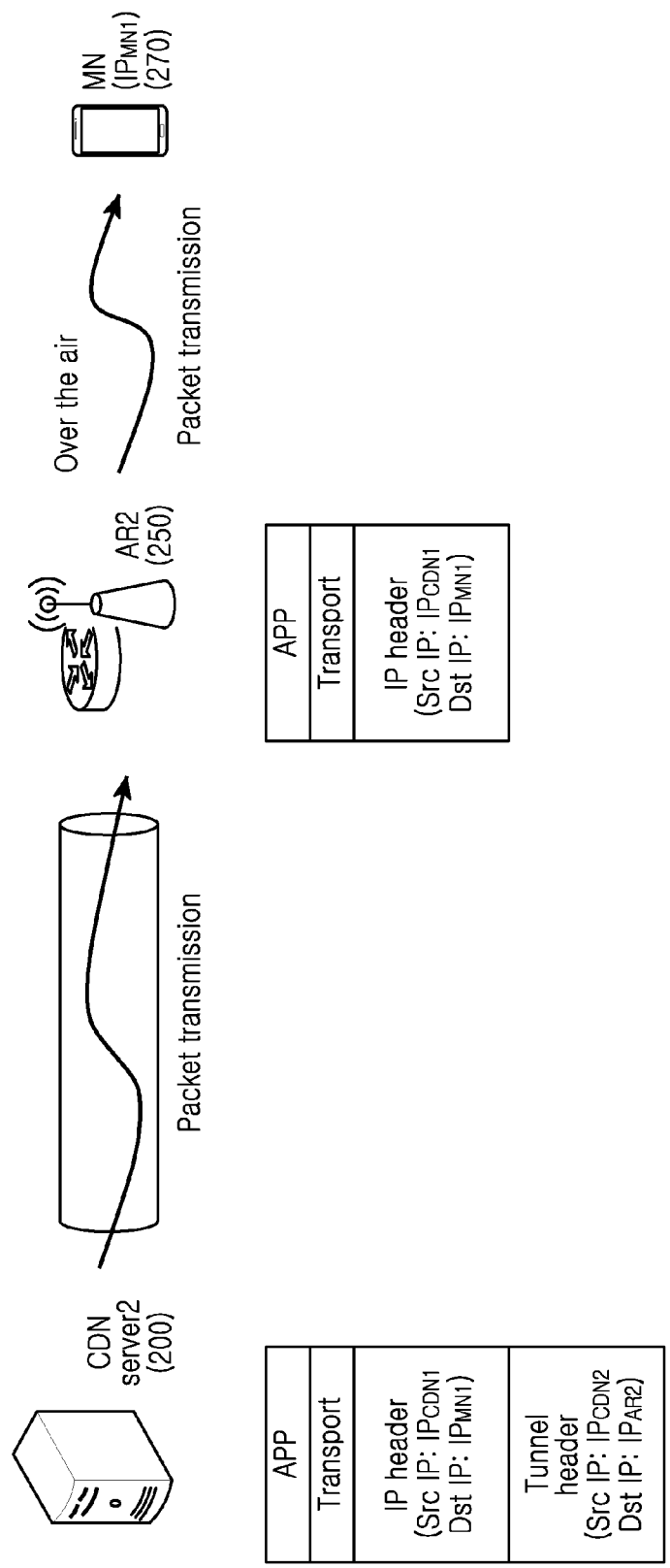
FIG. 2 is a diagram illustrating a tunneling based data path setup process according to an embodiment of the present invention.

FIG. 2 is a diagram illustrating a tunneling based data path setup process according to an embodiment of the present invention.

Referring to FIG. 2, a tunneling based data path setup process according to an embodiment of the present invention includes a non-intervening (i.e., MN-transparent) handover of MNs between CDN servers. In FIG. 2, tunneling technology is used as a method for preventing an MN from recognizing that a CDN server has changed.

The tunneling technology may create a session in a new CDN server (CDN server 2) 200 and transmit a tunnel creation request in a target BS (AR2) 250, thereby creating a tunnel between the CDN server 2 200 and the AR2 250.

Accordingly, regarding an IP packet for a session between a legacy CDN server and an MN 270, a tunneling header is attached to the IP packet, so as to transmit the IP packet from the CDN server 2 200 to the AR2 250. Then, packet transmission is performed. After the tunneling header is removed from the IP packet, which has arrived at the AR2 250, the original IP packet is forwarded to the MN 270.

Figure 3:
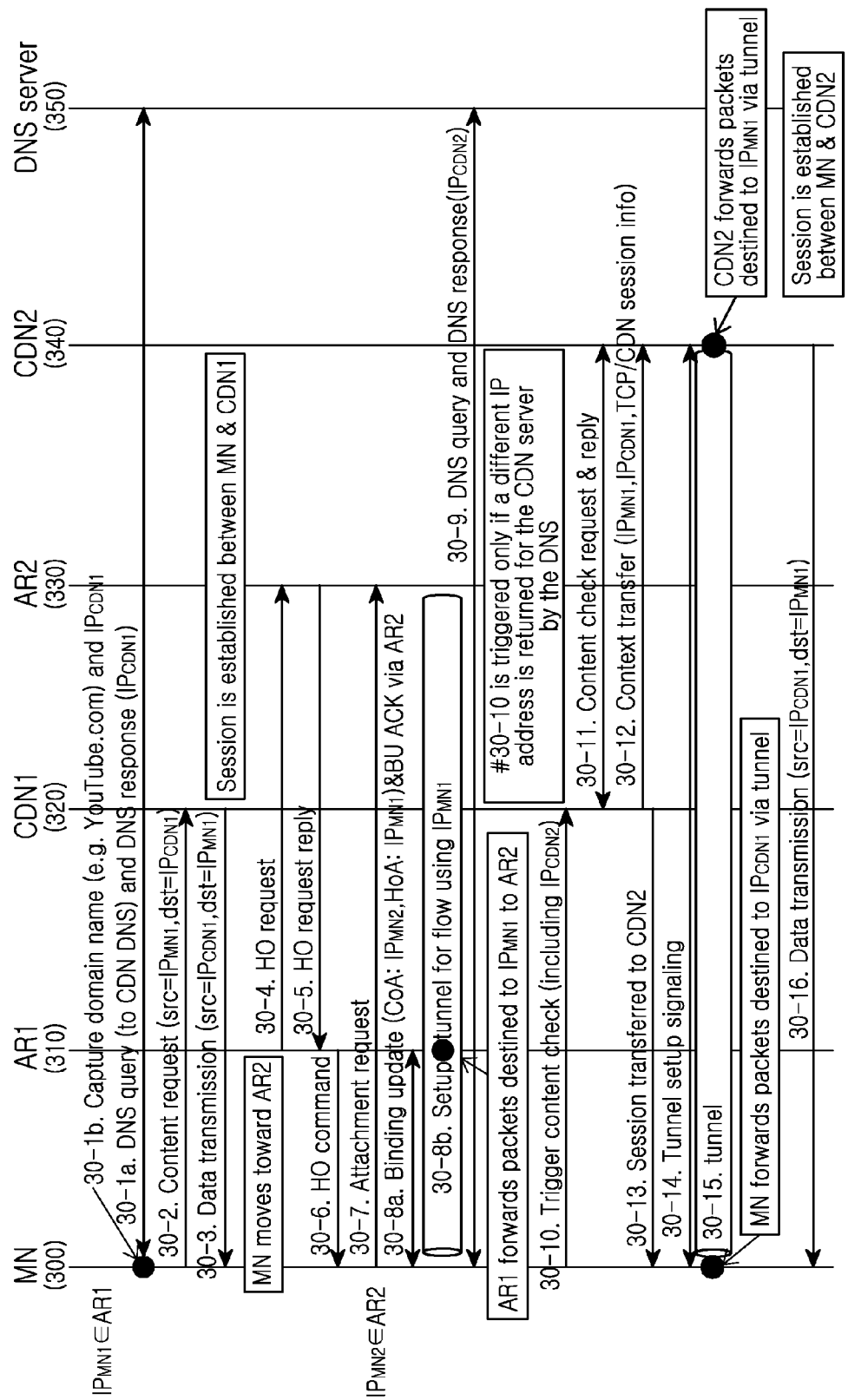
FIG. 3 is a message flow diagram illustrating a method for handover between content servers in which a Mobile Node (MN) directly takes part in signaling without intervention of a Base Station (BS) according to an embodiment of the present invention.

FIG. 3 is a message flow diagram illustrating a method for handover between content servers transparent to an AR according to an embodiment of the present invention.

Referring to FIG. 3, a message flow of a method for handover between content servers according to an embodiment of the present invention is transparent to an AR (i.e., is performed without the need for direct intervention of the AR).

While, an MN 300 is receiving a service under an AR1 310, the MN 300 sends a request for an IP address of a CDN server to a DNS server 350, and receives a response from the DNS server 350, at step 30-1a. Through the above process, the MN 300 acquires an IP address of a CDN1 320, which is a CDN closest to the MN 300, at step 30-1b.

After acquiring the IP address, the MN 300 sends a request for specific contents to the CDN1 320, and receives the specific contents from the CDN1 320, at steps 30-2 and 30-3. At this time, a session for downloading contents is established between the MN 300 and the CDN1 320.

Next, if the MN 300 performs handover to an AR2 330, a handover procedure is performed, at steps 30-4, 30-5, 30-6, and 30-7. Here, the handover procedure may include, not only the illustrated BS-based handover technique, but also an MN-based handover technique.

In the present example, it is assumed that the MN 300 uses a mobile IP. After the MN 300 performs the handover to the AR2 330, the MN 300 performs a binding update process with the AR2 330, at step 30-8a.

In the binding update process, a Home of Address (HoA) of the MN 300 becomes $IP_{MN1}$, and a Care of Address (CoA) becomes $IP_{MN2}$, which is an IP address acquired after the MN 300 performs the handover to the AR2 330. Together with the binding process, a tunnel is formed between the AR1 310 and the AR2 330, at step 30-8b. Through the tunnel, a packet destined from the CDN1 320 to the MN 300 is forwarded to the AR2 330 via the AR1 310 and then, the packet is forwarded to the MN 300.

After the MN 300 performs the handover to the AR2 330, to obtain information regarding a CDN closest to the MN 300, the MN 300 sends a request for an IP address of a CDN to the DNS server 350, and receives a response from the DNS server 350, at step 30-9.

Next, if the CDN included in the response of step 30-9 is different from the CDN1 320 (i.e., if the acquired IP address of the CDN is different from the IP address of the CDN1 320), the MN 300 sends a request for a content check to the CDN1 320, at step 30-10. The content check request includes an IP address of a CDN2 340. Content included in the content check represents content that the MN 300 is receiving from the CDN1 320.

After the content check request is sent, the CDN1 320 performs a content check process with the CDN2 340 and delivers information about corresponding content and information about a session to the CDN2 340, at steps 30-11 and 30-12. Next, the CDN1 320 notifies the MN 300 of the delivered information, at step 30-13. This process is included in the aforementioned session context information delivery process.

Next, through a tunnel setup process at step 30-14, a tunnel is formed between the MN 300 and the CDN2 340 through a tunnel setup process, at step 30-15. Through the tunnel, packets are forwarded from the CDN2 340 to the MN 300, at step 30-16. More specifically, through the tunnel, packets destined from CDN2 340 to $IP_{MN1}$ and packets destined from MN 300 to $IP_{cDN1}$ may be transmitted.

Figure 4:
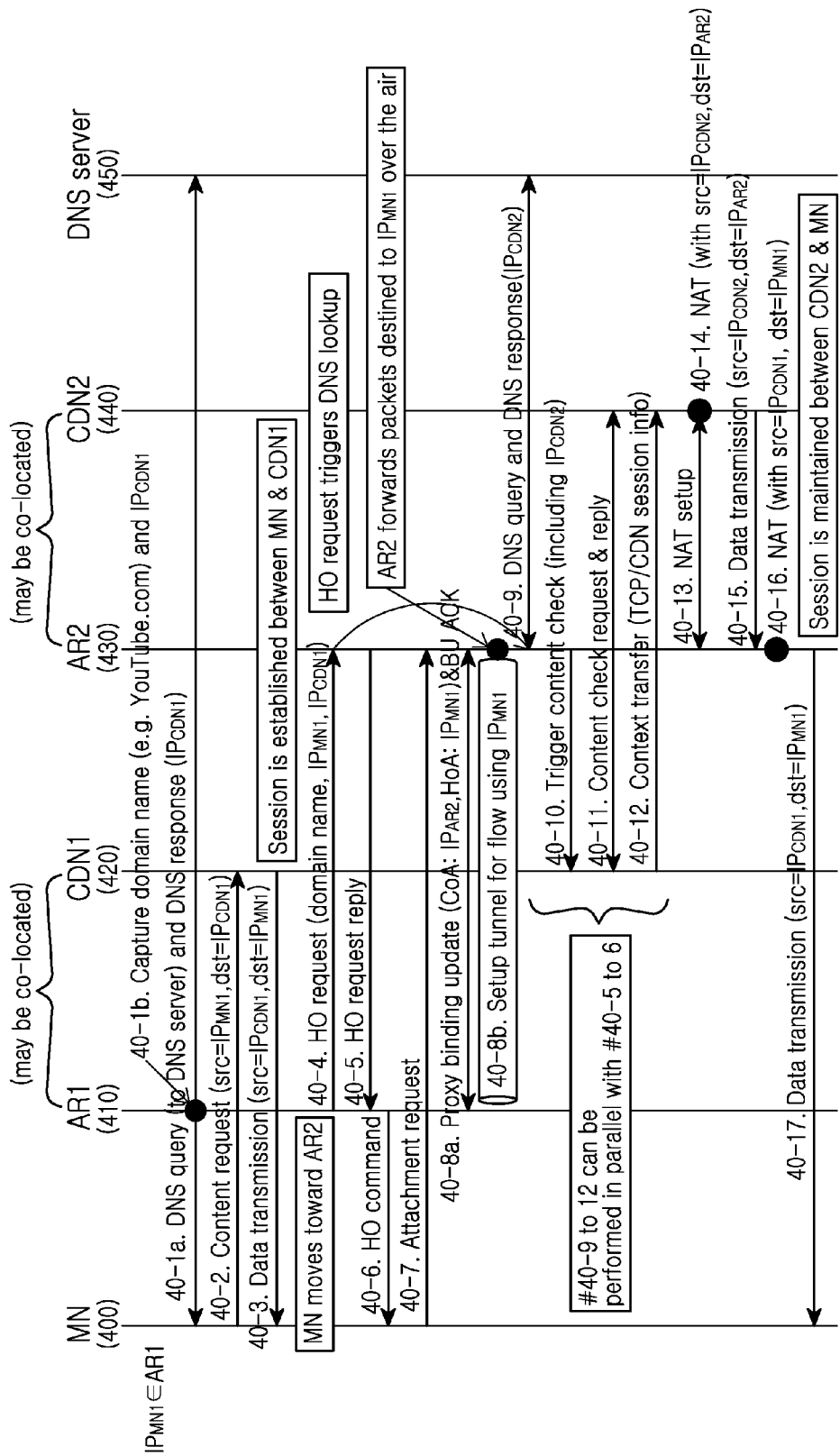
FIG. 4 is a first message flow diagram illustrating a method for handover between content servers through signaling between BSs without intervention of an MN according to an embodiment of the present invention.

FIG. 4 is a first message flow diagram illustrating a method for handover between content servers transparent to an MN according to an embodiment of the present invention.

Referring to FIG. 4, a message flow of a method for handover between content servers according to an embodiment of the present invention is transparent to an MN (i.e., is performed without the need for direct intervention of the MN). FIG. 4 illustrates an example according to FIG. 1 in more detail.

While an MN 400 accesses an AR1 410 and is receiving a service from the AR1 410, the MN 400 sends a request for an IP address of a CDN to a DNS server 450, and receives a response from the DNS server 450, at step 40-1a. Through the above process, the MN 400 acquires an IP address of a CDN1 420, which is a CDN closest to the MN 400, at step 40-1b.

After acquiring the IP address, the MN 400 sends a request for specific contents to the CDN1 420, and receives the specific contents from the CDN1 420, at steps 40-2 and 40-3. At this time, a session for contents downloading is established between the MN 400 and the CDN1 420.

Next, if the MN 400 performs handover to an AR2 430, a handover procedure is performed, at steps 40-4, 40-5, 40-6, and 40-7. Here, the handover procedure may include, not only the illustrated BS-based handover technique, but also an MN-based handover technique.

In the present example, it is assumed that the AR1 410 and the AR2 430 use a proxy mobile IP. The AR1 410 performs a proxy binding update process with the AR2 430, at step 40-8a.

In the binding update process, a Home of Address (HoA) of the MN 400 becomes $IP_{MN1}$, and a Care of Address (CoA) becomes $IP_{AR2}$, which is an IP address of the AR2 430 after the MN 400 performs the handover to the AR2 430. Together with the binding process, a tunnel is formed between the AR1 410 and the AR2 430, at step 40-8b. Through the tunnel, a packet destined from the CDN1 420 to the MN 400 is forwarded to the AR2 430 via the AR1 410 and then, the packet is forwarded to the MN 400.

After the MN 400 performs the handover to the AR2 430, in order to obtain information regarding a CDN closest to the MN 400, the AR2 430, in place of the MN 400, sends a request for an IP address of a CDN to the DNS server 450, and receives a response from the DNS server 450, at step 40-9.

Next, if the CDN included in the response of step 40-9 is different from the CDN1 420 (i.e., if the acquired IP address of the CDN is different from the IP address of the CDN1 420), the AR2 430 sends a request for a content check to the CDN1 420, at step 40-10. The content check request includes an IP address of a CDN2 440. Content included in the content check represents content that the AR2 430 is receiving from the CDN1 420.

After the content check request is sent, the CDN1 420 performs a content check process with the CDN2 440 and delivers information about corresponding content and information about a session to the CDN2 440, at steps 40-11 and 40-12. Next, the CDN1 420 notifies the MN 400 of the delivered information, at step 40-13. This process is included in the aforementioned session context information delivery process.

After the notification is performed, a NAT process is performed in the CDN2 440, at steps 40-13 and 40-14. Through the NAT process, packets are forwarded from the CDN2 440 to the AR2 430, at step 40-15. Similarly, a NAT process is performed in the AR2 440, at step 40-16. Through the NAT process, packets are forwarded from the AR2 430 to the MN 400, at step 40-17. A detailed NAT process is the same as a description of FIG. 1. Through the NAT process, a previous session (i.e., a session between the MN 400 and the CDN1 420) is continuously maintained between the MN 400 and the CDN2 440.

Figure 5:
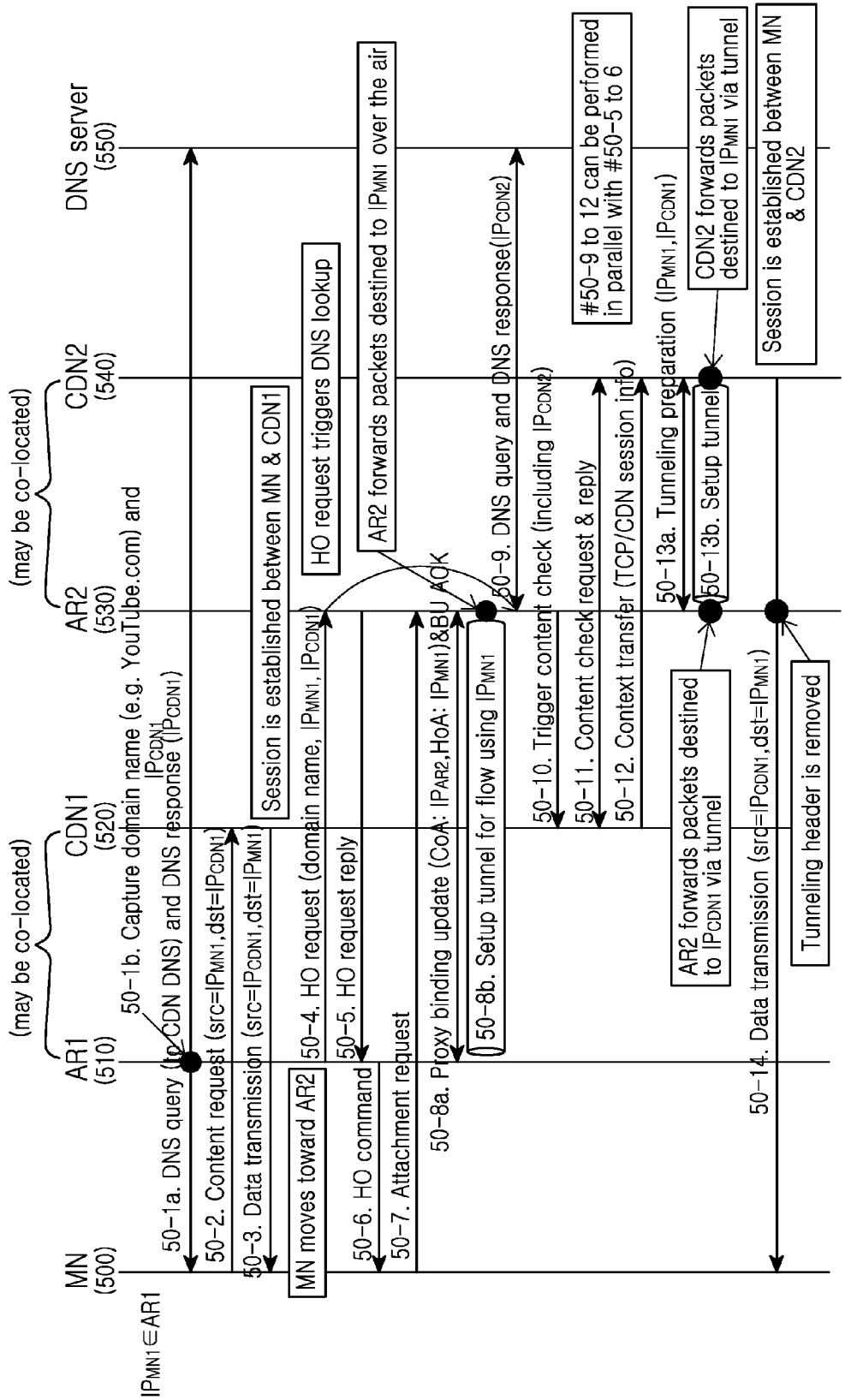
FIG. 5 is a second message flow diagram illustrating a method for handover between content servers through signaling between BSs without intervention of an MN according to an embodiment of the present invention.

FIG. 5 is a second message flow diagram illustrating a method for handover between content servers transparent to an MN according to an embodiment of the present invention.

Referring to FIG. 5, a message flow of a method for handover between content servers according to an embodiment of the present invention is transparent to an MN (i.e., without direct intervention of the MN). FIG. 5 illustrates an example according to FIG. 2 in more detail.

While an MN 500 is receiving a service under an AR1 510, the MN 500 sends a request for an IP address of a CDN to a DNS server 550, and receives a response from the DNS server 550, at step 50-1a. Through the above process, the MN 500 acquires an IP address of a CDN1 520, which is a CDN closest to the MN 500, at step 50-1b.

After acquiring the IP address, the MN 500 sends a request for specific contents to the CDN1 520, and receives the specific contents from the CDN1 520, at steps 50-2 and 50-3. At this time, a session is established between the MN 500 and the CDN1 520.

Next, if the MN 500 performs handover to an AR2 530, a handover procedure is performed, at steps 50-4, 50-5, 50-6, and 50-7.

In the present example, it is assumed that the AR1 510 and the AR2 530 use a proxy mobile IP. The AR1 510 performs a proxy binding update process with the AR2 530, at step 50-8a.

In the binding update process, a Home of Address (HoA) of the MN 500 becomes $IP_{MN1}$, and a Care of Address (CoA) becomes $IP_{AR2}$, which is an IP address of the AR2 530 after the MN 500 performs the handover to the AR2 530. Together with the binding process, a tunnel is formed between the AR1 510 and the AR2 530, at step 50-8b. Through the tunnel, a packet destined from the CDN1 520 to the MN 500 is forwarded to the AR2 530 via the AR1 510 and then, is forwarded to the MN 500.

After the MN 500 performs the handover to the AR2 530, to know a CDN closest to the MN 500, the AR2 530 in place of the MN 500 sends a request for an IP address of a CDN to the DNS server 550, and receives a response from the DNS server 550, at step 50-9.

If the CDN included in the response of step 50-9 is different from the CDN1 520 (i.e., if the acquired IP address of the CDN is different from the IP address of the CDN1 520), the AR2 530 sends a request for content check to the CDN1 520, at step 50-10. The content check request includes an IP address of a CDN2 540. Content included in the content check represents content that the AR2 530 is receiving from the CDN1 520.

After the content check request is sent, the CDN1 520 performs a content check process with the CDN2 540 and delivers information about corresponding content and information about a session to the CDN2 540, at steps 50-11 and 50-12. This process is included in the aforementioned session context information delivery process.

Next, a tunnel is formed between the AR2 530 and the CDN2 540, at steps 50-13a and 50-13b. Through the tunnel, packets destined from the CDN1 520 to the MN 500 are forwarded to the MN 500, at step 50-14.

Through the tunneling process, a previous session (i.e., a session between the MN 500 and the CDN1 520) is continuously maintained between the MN 500 and the CDN2 540.

Figure 6:
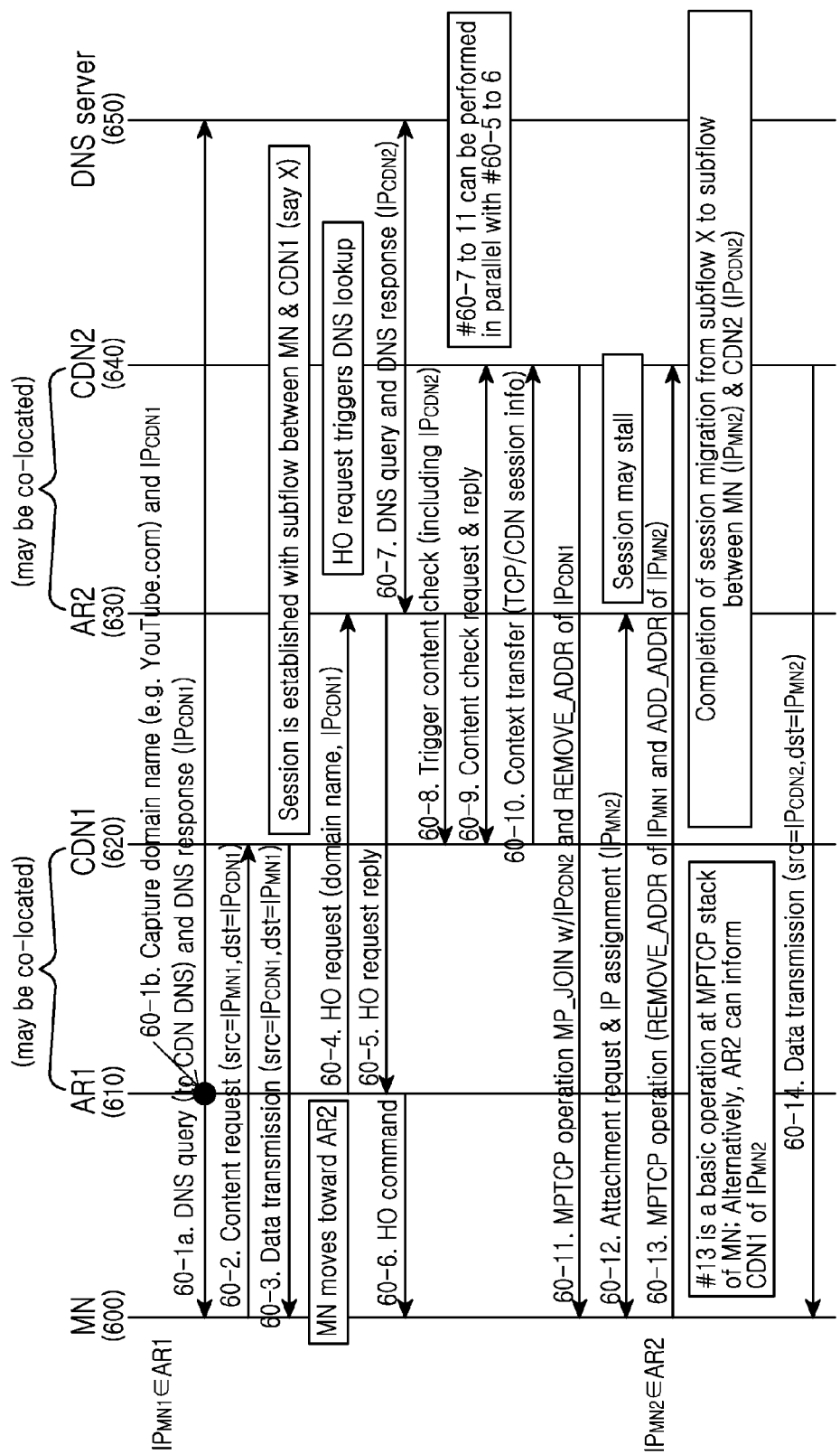
FIG. 6 is a message flow diagram illustrating a method for handover between content servers using multi-path transmission control protocol (MPTCP) between an MN and a content server according to an embodiment of the present invention.

FIG. 6 is a message flow diagram illustrating a method for handover between content servers using Multi-Path Transmission Control Protocol (MPTCP) according to an embodiment of the present invention.

Referring to FIG. 6, an MPTCP based transmission path movement is described as follows. Detailed content of the MPTCP may refer to [RFC6824] Ford, A., Raiciu, C., Handley, M., and O. Bonaventure, "TCP Extensions for Multipath Operation with Multiple Addresses", RFC 6824, January 2013, available at tools.ietf.org/html.rfc6824, the entire content of which is incorporated herein by reference. Data path setup using the MPTCP is a method using an MPTCP protocol of a transport layer, which is an upper layer, but not the aforementioned network layer based data path setup (IP header correction or IP tunneling using).

Accordingly, there is no need for IP address information delivery between ARs. Instead, context information to be delivered between CDN servers is changed into context information according to MPTCP in place of legacy TCP. Particularly, token information (or a key for creating a token) for authenticating and identifying an MPTCP session should be delivered together. Other information is constructed in a manner similar to that according to TCP.

If information delivery for moving a session from a legacy CDN server to a new CDN server is completed as above, the new CDN server adds a subflow to a session in which an MN has already connected with the legacy CDN server, through an MP_JOIN option being an MPTCP operation, using its own IP address.

After, the new CDN server removes an IP address of the legacy CDN server, through an REMOVE_ADDR option being an MPTCP operation.

Meantime, if the MN performs handover to a target AR, the new CDN server removes the legacy IP address through the REMOVE_ADDR option, which is an MPTCP operation, and adds a newly-assigned IP address through an ADD_ADDR option, which is an MPTCP operation. Through this process, the MPTCP session is moved from the legacy CDN server and the MN to the new CDN server and the MN. Further details of this process are described as follows with reference to FIG. 6.

While an MN 600 is receiving a service under an AR1 610, the MN 600 sends a request for an IP address of a CDN to a DNS server 650, and receives a response from the DNS server 650, at step 60-1a. Through the above process, the MN 600 acquires an IP address of a CDN1 620, which is a CDN closest to the MN 600, at step 60-1b.

After acquiring the IP address, the MN 600 sends a request for specific contents to the CDN1 620, and receives the specific contents from the CDN1 620, at steps 60-2 and 60-3. At this time, a session for contents downloading is established between the MN 600 and the CDN1 620.

Next, if the MN 600 performs handover to an AR2 630, a handover procedure is performed, at steps 60-4, 60-5, and 60-6. Here, in order to obtain information regarding a CDN closest to the MN 600, the AR2 630 sends a request for an IP address of a CDN to the DNS server 650, and receives a response from the DNS server 650, at step 60-7.

If the CDN included in the response of step 60-7 is different from the CDN1 620 (i.e., if the acquired IP address of the CDN is different from the IP address of the CDN1 620), the AR2 630 sends a request for a content check to the CDN1 620. The content check request includes an IP address of a CDN2 640. Content included in the content check represents content that the AR2 630 is receiving from the CDN1 620.

After the content check request is sent, the CDN1 620 performs a content check process with the CDN2 640 and delivers information about corresponding content and information about a session to the CDN2 640, at steps 60-8, 60-9, and 60-10. This process is included in the aforementioned session context information delivery process.

The CDN2 640 adds a subflow to a session in which the MN 600 has already connected with the CDN1 620, through an MP_JOIN option, which is an MPTCP operation, using its own IP address. Next, the CDN2 640 removes an IP address of the CDN1 620, through an REMOVE_ADDR option, which is an MPTCP operation, at step 60-11.

An IP address assignment process is performed between the MN 600 and the AR2 630, at step 60-12. The process of step 60-12 can be performed just after the process of step 6, since the process of steps 60-7 to 60-11 can be performed concurrently with the process of steps 60-5 and 60-6.

Because the process of steps 60-5 and 60-6 is a process of performing handover between the MN 600 and the AR2 630 and the process of steps 60-7 to 60-11 is a process of performing operations between network entities, the process of steps 60-5 and 60-6 and the process of steps 60-7 to 60-11 can be performed in parallel. More specifically, just after the MN 600 performs handover to the AR2 630, the MN 600 may receive a new IP address (i.e., $IP_{MN2}$) from the AR2 630.

After the step 60-12 is performed, the MN 600 removes the legacy IP address through the REMOVE_ADDR option, which is an MPTCP operation, and newly adds a newly assigned IP address through an ADD_ADDR option, which is also an MPTCP operation, at step 60-13. Through this process, the MPTCP session is moved from the CDN1 620 and the MN 600 to the CDN2 640 and the MN 600.

After step 60-13 is performed, packets destined from the CDN2 640 to the MN 600 are forwarded through the moved session, at step 60-14.

Figure 7:
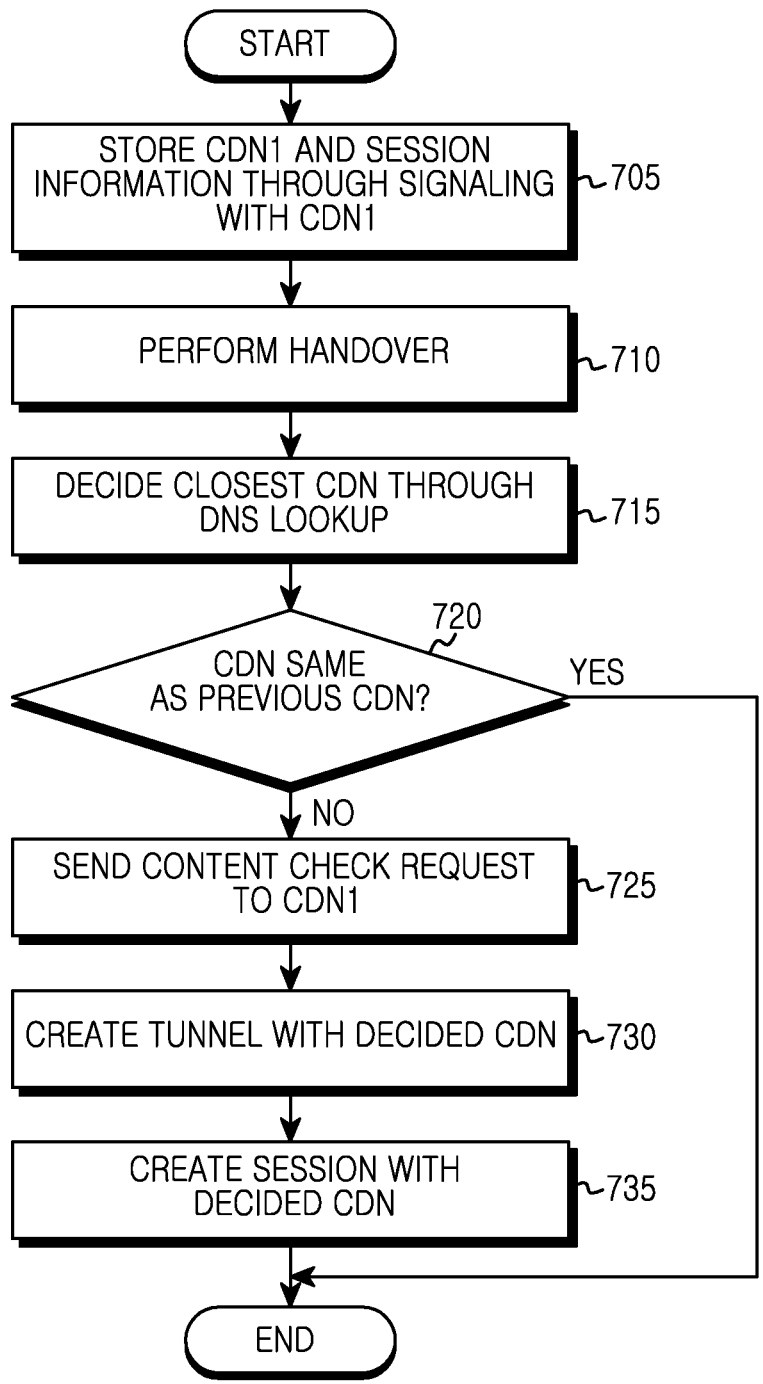
FIG. 7 is a flowchart illustrating an operation process of an MN in a process of handover between content servers not needing intervention of a BS according to an embodiment of the present invention.

FIG. 7 is a flowchart illustrating an operation process of an MN in a process of handover between content servers transparent to an AR according to an embodiment of the present invention. FIG. 7 is a flowchart illustrating an operation process of an MN of FIG. 3.

Referring to FIG. 7, the MN 300 stores information of the CDN1 320 and a session through signaling with the CDN1 320, at step 705.

After the information is stored, the MN 300 performs handover, at step 710, and determines the closest CDN through DNS lookup, at step 715. In FIG. 3, a CDN2 340 becomes the closest CDN.

If it is determined that the decided CDN 340 is not the same as a CDN before handover, at step 720, the MN 300 sends a request for content check to the CDN1 320, at step 725.

Next, the MN 300 creates a tunnel with the decided CDN (i.e., CDN2 340), at step 730, and creates a session, at step 735.

Figure 8:
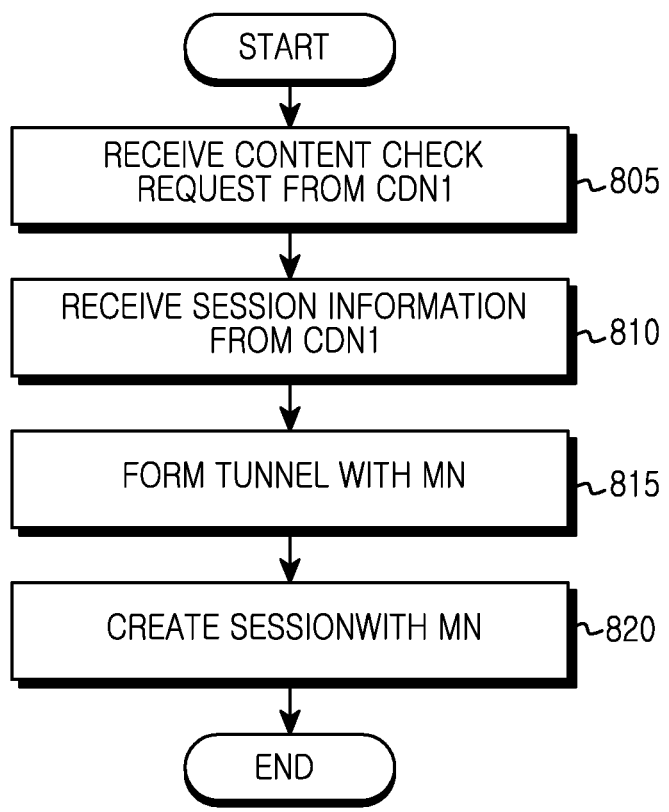
FIG. 8 is a flowchart illustrating an operation process of a Content Delivery Network CDN2 in a process of handover between content servers not needing intervention of a BS according to an embodiment of the present invention.

FIG. 8 is a flowchart illustrating an operation process of a CDN in a process of handover between content servers transparent to an AR according to an embodiment of the present invention. FIG. 8 is a flowchart illustrating an operation process of the CDN2 340 of FIG. 3.

Referring to FIG. 8, the CDN2 340 receives a content check request from the CDN1 320, at step 805. After receiving the content check request, the CDN2 340 receives session context information from the CDN1 320, at step 810.

Next, the CDN2 340 forms a tunnel with an MN 300, at step 815, and creates a session with the MN 300, at step 820.

Figure 9:
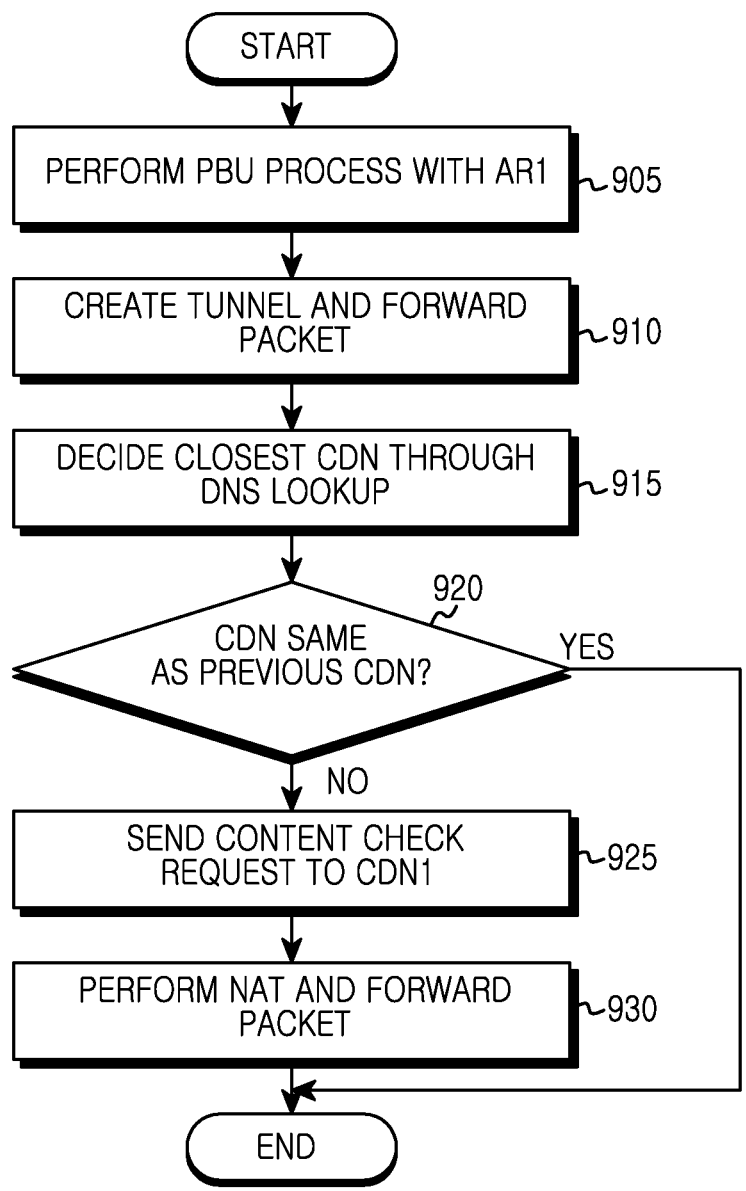
FIG. 9 is a flowchart illustrating an operation process of an Access Router (AR) in a process of handover between content servers not needing intervention of an MN according to an embodiment of the present invention.

FIG. 9 is a flowchart illustrating an operation process of an AR in a process of handover between content servers transparent to an MN according to an embodiment of the present invention. FIG. 9 is a flowchart illustrating an operation process of the AR2 430 of FIG. 4.

Referring to FIG. 9, the AR2 430 performs a Proxy Binding Update (PBU) process with the AR1 410, at step 905.

After that, the AR2 430 creates a tunnel, and forwards packets through the tunnel, at step 910.

Next, the AR2 430 decides the closest CDN through DNS lookup, at step 915. In FIG. 4, a CDN2 440 is determined to be the closest CDN.

If it is determined that the decided CDN (i.e., CDN2 440) is not the same as a CDN before handover (i.e., CDN1 420), at step 920, the AR2 sends a request for a content check to the CDN1 420, at step 925.

Next, the AR2 430 performs NAT, and forwards packets through the NAT, at step 930.

Figure 10:
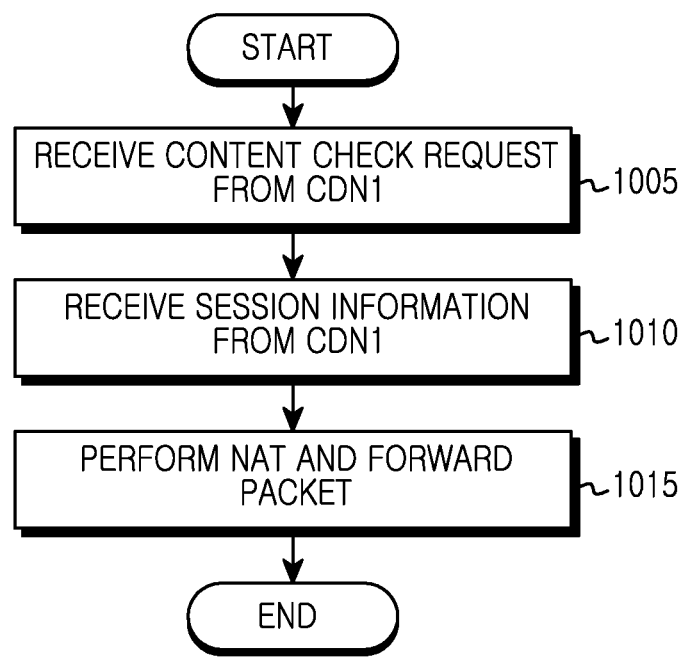
FIG. 10 is a flowchart illustrating an operation process of a CDN in a process of handover between content servers not needing intervention of an MN according to an embodiment of the present invention.

FIG. 10 is a flowchart illustrating an operation process of a CDN in a process of handover between content servers transparent to an MN according to an embodiment of the present invention. FIG. 10 is a flowchart illustrating an operation process of the CDN2 430 of FIG. 4.

Referring to FIG. 10, the CDN2 430 receives a content check request from the CDN1 420, at step 1005. After that, the CDN2 440 receives session context information from the CDN1 420, at step 1010.

After receiving the session context information, the CDN2 440 performs NAT, and forwards packets through the NAT, at step 1015.

Figure 11:
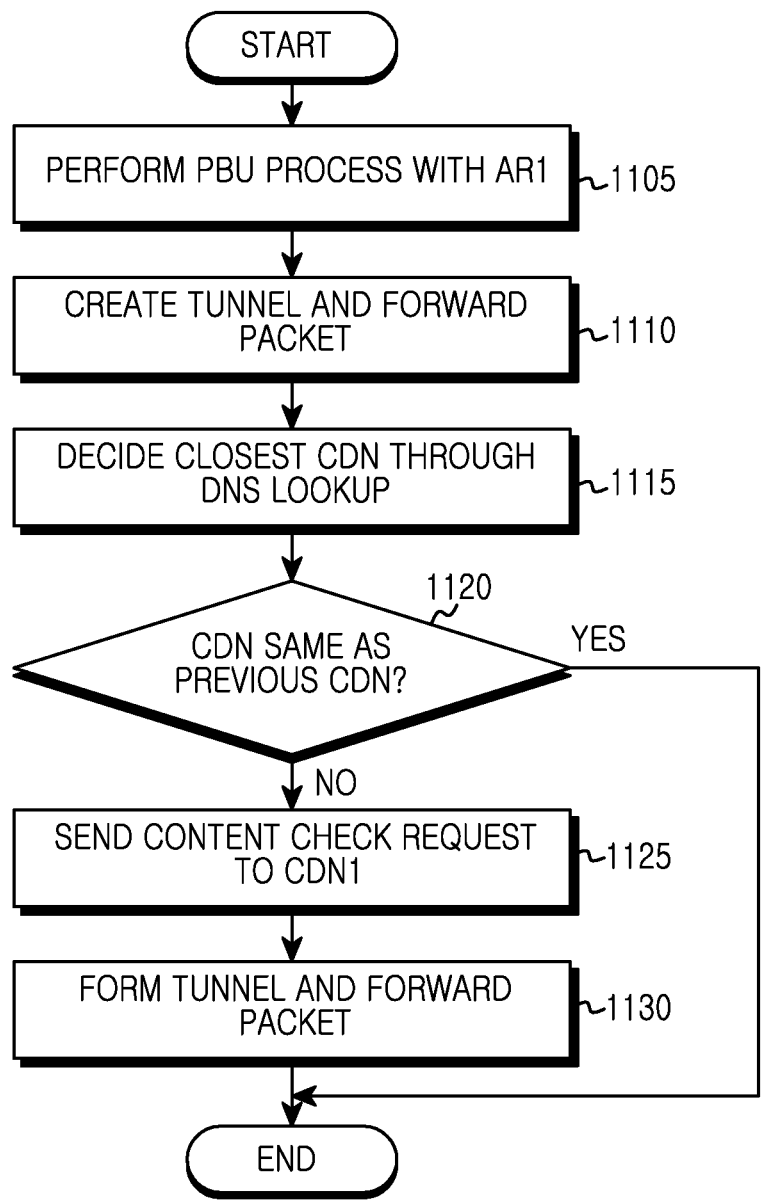
FIG. 11 is another flowchart illustrating an operation process of an AR in a process of handover between content servers not needing intervention of an MN according to an embodiment of the present invention.

FIG. 11 is a flowchart illustrating an operation process of an AR in a process of handover between content servers transparent to an MN according to an embodiment of the present invention. FIG. 11 is a flowchart illustrating an operation process of the AR2 530 of FIG. 5.

Referring to FIG. 11, the AR2 530 performs a PBU process with the AR1 510, at step 1105.

After that, the AR2 530 creates a tunnel, and forwards packets through the tunnel, at step 1110.

Next, the AR2 530 decides the closest CDN through DNS lookup, at step 1115. In FIG. 5, the CDN2 540 becomes the closest CDN.

If it is determined that the decided CDN (i.e., CDN2 540) is not the same as a CDN before handover (i.e., CDN1 520), at step 1120, the AR2 530 sends a request for content check to the CDN1520, at step 1125.

Next, the AR2 530 forms a tunnel, and forwards packets through the tunnel, at step 1130.

Figure 12:
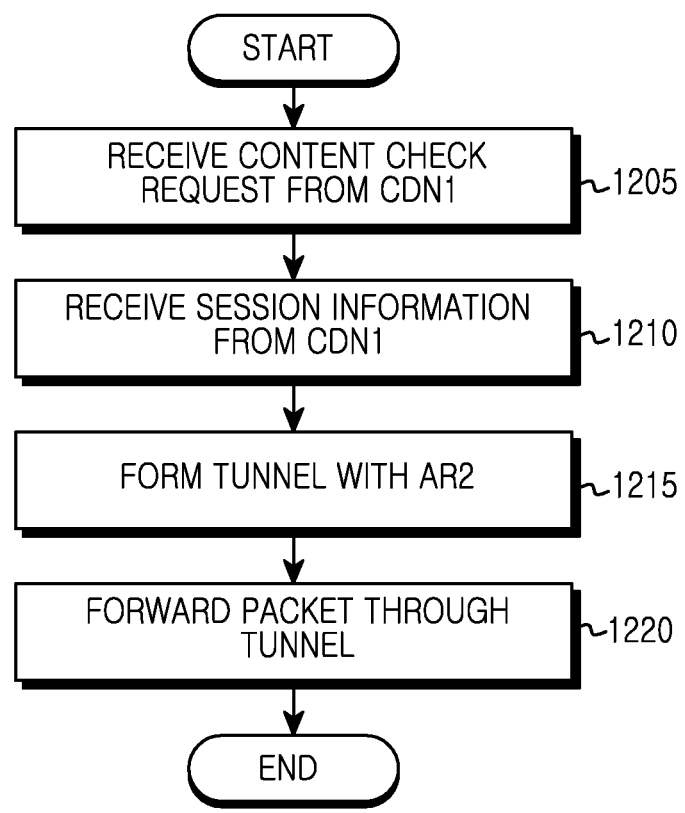
FIG. 12 is another flowchart illustrating an operation process of a CDN in a process of handover between content servers not needing intervention of an MN according to an embodiment of the present invention.

FIG. 12 is a flowchart illustrating an operation process of a CDN in a process of handover between content servers transparent to an MN according to an embodiment of the present invention. FIG. 12 is a flowchart illustrating an operation process of the CDN2 540 of FIG. 5.

Referring to FIG. 12, the CDN2 540 receives a content check request from the CDN1 520, at step 1205. After receiving the content check request, the CDN2 540 receives session context information from the CDN1 520, at step 1210.

Next, the CDN2 540 forms a tunnel with the AR2 530, at step 1215, and creates a session with the MN 500, at step 1220.

Figure 13:
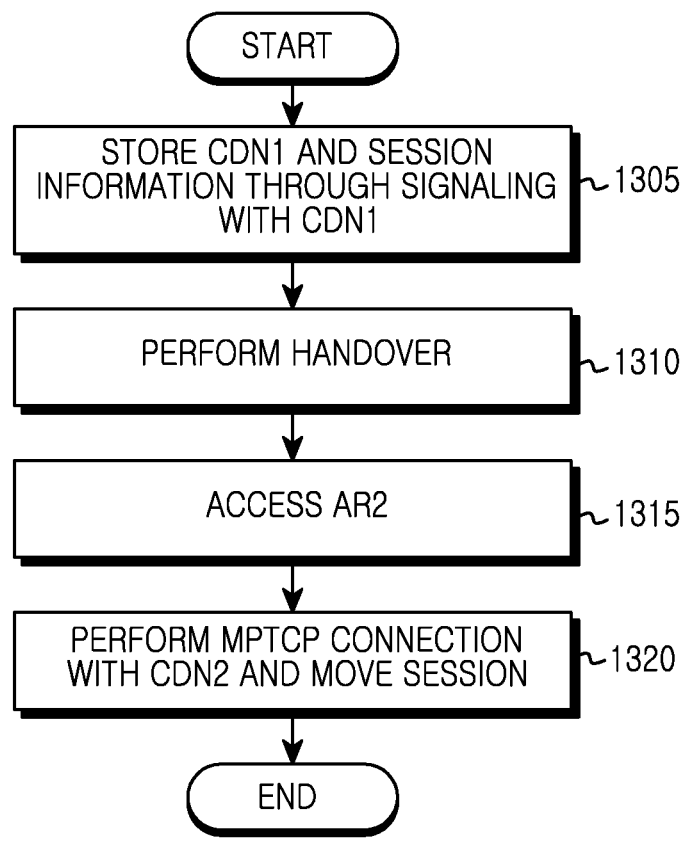
FIG. 13 is a flowchart illustrating an operation process of an MN in a process of handover between content servers using MPTCP according to an embodiment of the present invention.

FIG. 13 is a flowchart illustrating an operation process of an MN in a process of handover between content servers using MPTCP according to an embodiment of the present invention. FIG. 13 is a flowchart illustrating an operation process of the MN 600 of FIG. 6.

Referring to FIG. 13, the MN 600 stores information of the CDN1 620 and a session through signaling with the CDN1 620, at step 1305.

After storing the information, the MN 600 performs handover, at step 1310, and accesses the AR2 630, at step 1315.

Next, the MN 600 performs an MPTCP connection with the CDN2 640 and moves a session, at step 1320.

Figure 14:
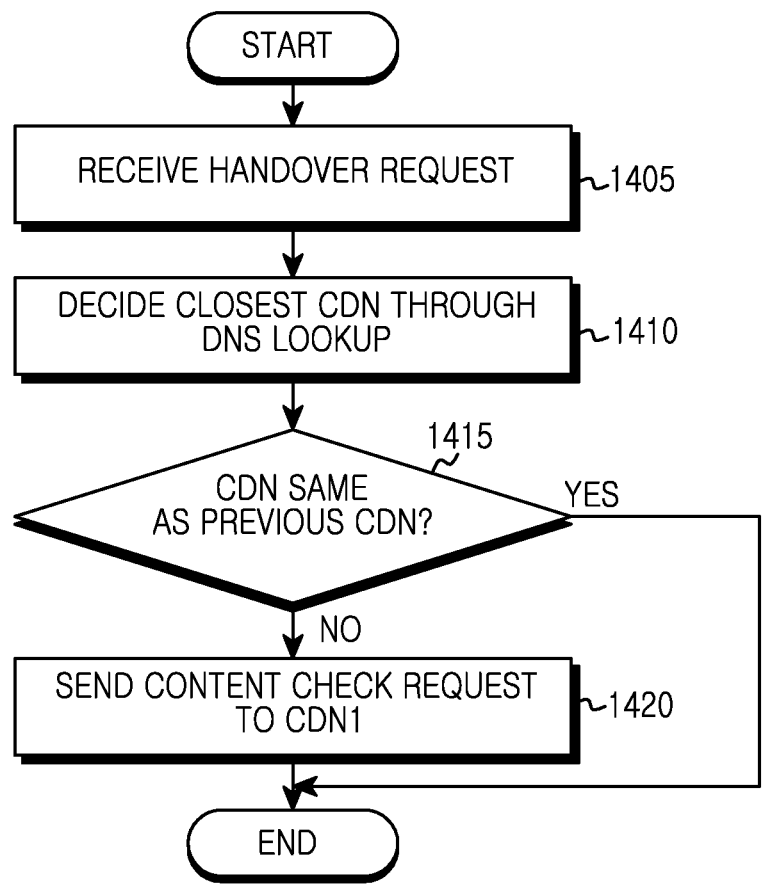
FIG. 14 is a flowchart illustrating an operation process of an AR in a process of handover between content servers using MPTCP according to an embodiment of the present invention.

FIG. 14 is a flowchart illustrating an operation process of an AR in a process of handover between content servers using MPTCP according to an embodiment of the present invention. FIG. 14 is a flowchart illustrating an operation process of the AR2 630 of FIG. 6.

Referring to FIG. 14, the AR2 630 receives a handover request, at step 1405.

Next, the AR2 630 decides the closest CDN through DNS lookup, at step 1410. In FIG. 6, a CDN2 640 becomes the closest CDN.

If it is determined that the decided CDN (i.e., CDN2 640) is not the same as a CDN before handover (i.e., CDN1 620), at step 1415, the AR2 630 sends a request for content check to the CDN1 620, at step 1420.

Figure 15:
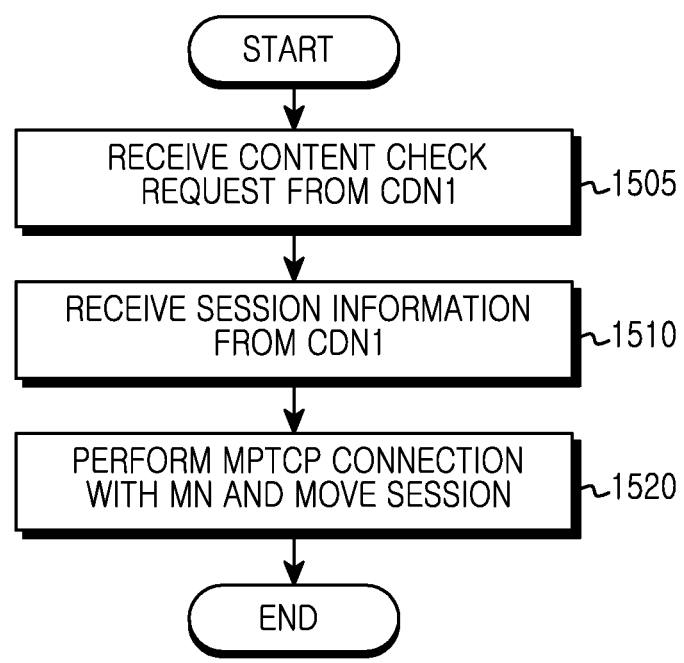
FIG. 15 is a flowchart illustrating an operation process of a CDN in a process of handover between content servers using MPTCP according to an embodiment of the present invention.

FIG. 15 is a flowchart illustrating an operation process of a CDN in a process of handover between content servers using MPTCP according to an embodiment of the present invention. FIG. 15 is a flowchart illustrating an operation process of the CDN2 640 of FIG. 6.

Referring to FIG. 15, the CDN2 640 receives a content check request from the CDN1 620, at step 1505. After receiving the content check request, the CDN2 640 receives session context information from the CDN1 620, at step 1510.

Next, the CDN2 640 performs an MPTCP connection with the MN 600 and moves a session, at step 1520.

Figure 16:
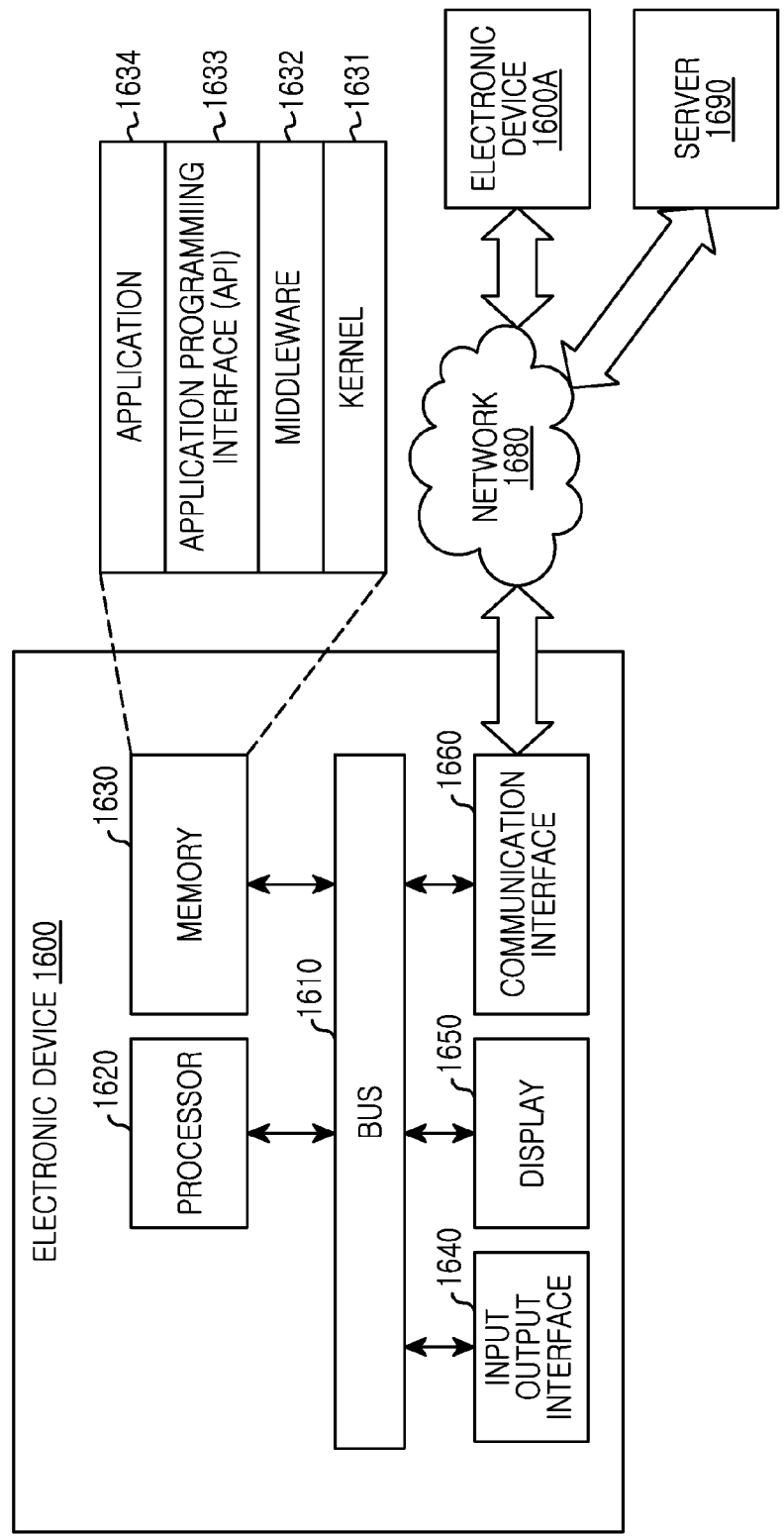
FIG. 16 is a diagram illustrating a network environment including an electronic device (i.e., an MN) according to an embodiment of the present invention.

FIG. 16 is a diagram illustrating a network environment including an electronic device (i.e., an MN) according to an embodiment of the present invention.

Referring to FIG. 16, according to an embodiment of the present invention, an electronic device 1600 includes a bus 1610, a processor 1620, a memory 1630, an input/output interface 1640, a display 1650, and a communication interface 1660.

The bus 1610 is a circuit connecting the aforementioned constituent elements with one another and forwarding communication (e.g., a control message) between the aforementioned constituent elements.

The processor 1620, for example, receives instructions from the aforementioned other constituent elements (e.g., the memory 1630, the input/output interface 1640, the display 1650, the communication interface 1660 and the like) through the bus 1610, deciphers the received instructions, and executes operation or data processing according to the deciphered instructions.

The memory 1630 stores instructions or data that are received from the processor 1620 or the other constituent elements (e.g., the input/output interface 1640, the display 1650, the communication interface 1660 and the like) or is created by the processor 1620 or the other constituent elements.

The memory 1630 includes, for example, programming modules, such as a kernel 1631, a middleware 1632, an Application Programming Interface (API) 1633, an application 1634 or the like. The aforementioned programming modules each may include software, firmware, hardware or a combination thereof.

The kernel 1631 controls or manages system resources (e.g., the bus 1610, the processor 1620, the memory 1630 or the like) used for executing operations or functions implemented in the remnant other programming modules, such as the middleware 1632, the API 1633, or the application 1634.

The kernel 1631 also provides an interface enabling the middleware 1632, the API 1633, or the application 1634 to connect and control or manage the individual constituent element of the electronic device 1600.

The middleware 1632 performs a relay role of enabling the API 1633 or the application 1634 to communicate and exchange data with the kernel 1631. Also, in relation to work requests received from the application 1634, the middleware 1632 performs control (e.g., scheduling or load balancing) for the work requests using a method of allocating at least one application among the applications 1634 priority order capable of using the system resources (e.g., the bus 1610, the processor 1620, the memory 1630 or the like) of the electronic device 1600.

The API 1633 is an interface enabling the application 1634 to control a function provided by the kernel 1631 or the middleware 1632. The API 1633 may, for example, include at least one interface or function (e.g., an instruction) for file control, window control, picture processing, character control or the like.

According to an embodiment of the present invention, the application 1634 may perform an operation of the electronic device 1600 shown and descried with reference to FIG. 1 to FIG. 15. Additionally or alternatively, the application 1634 may be related with information exchange between the electronic device 1600 and an external electronic device (e.g., an electronic device 1600A). The application related with the information exchange may include, for example, a notification relay application for relaying specific information to the external electronic device 1600A, or a device management application for managing the external electronic device 1600A.

According to an embodiment of the present invention, the application 1634 may include an application designated in accordance to an attribute (e.g., the kind of electronic device) of the external electronic device (e.g., the electronic device 1600A).

The input/output interface 1640 forwards instructions or data, which are input from a user through an input/output device (e.g., a sensor, a keyboard or a touch screen), for example, to the processor 1620, the memory 1630, or the communication interface 1660 through the bus 1610. For example, the input/output interface 1640 may provide data about a user's touch input through the touch screen, to the processor 1620. Also, the input/output interface 1640 may, for example, output through the input/output device (e.g., a speaker or a display) an instruction or data which is received from the processor 1620, the memory 1630, or the communication interface 1660 through the bus 1610. For example, the input/output interface 1640 may output voice data, which is processed through the processor 1620, to the user through the speaker.

The display 1650 displays various information (e.g., multimedia data, text data, or the like) to a user. The communication interface 1660 connects communication between the electronic device 1600 and external devices (e.g., the electronic device 1600A or the server 1690). For example, the communication interface 1660 may be connected to a network 1680 through wireless communication or wired communication, and communicate with the external device. The wireless communication may, for example, include at least one of Wireless Fidelity (WiFi), Bluetooth (BT), Near Field Communication (NFC), Global Positioning System (GPS) or cellular communication (e.g., Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM) or the like). The wired communication may include communications performed through at least one of a Universe Serial Bus (USB), a High Definition Multimedia Interface (HDMI), a Recommended Standard-232 (RS-232), or a Plain Old Telephone Service (POTS).

According to an embodiment of the present invention, the network 1680 may be a telecommunications network. The telecommunications network may include at least one of a computer network, the Internet, internet of things, or a telephone network. According to an embodiment of the present invention, a protocol (e.g., a transport layer protocol, a data link layer protocol, or a physical layer protocol) for communication between the electronic device 1600 and the external device may be supported in at least one of the application 1634, the application programming interface 1633, the middleware 1632, the kernel 1631, or the communication interface 1660.

Figure 17:
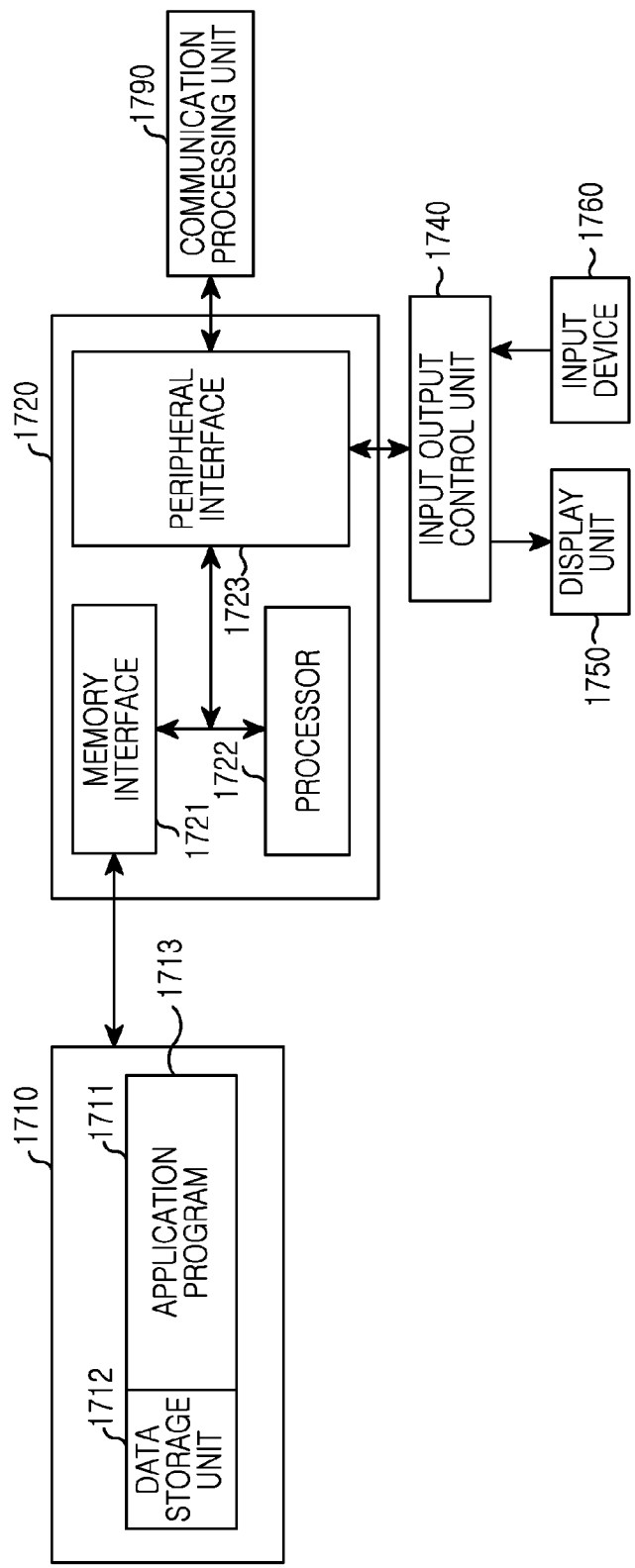
FIG. 17 is a diagram illustrating a block construction of an AR and a CDN according to an embodiment of the present invention.

FIG. 17 is a diagram illustrating a block construction of an AR and a CDN according to an embodiment of the present invention.

Referring to FIG. 17, an AR and a CDN include a memory 1710, a processor unit 1720, an input output control unit 1740, a display unit 1750, and an input device 1760. There may be a plurality of memories 1710 in accordance with embodiments of the present invention. The constituent elements are each described as follows. The construction and operations described with respect to FIG. 17 are applicable to either an AR or a CDN. Accordingly, in the following description with reference to FIG. 17, the expression "the AR and CDN" refers to a construction and operations with respect to either an AR or a CDN.

The memory 1710 includes a program storage unit 1711 storing a program for controlling an operation of the AR and CDN and a data storage unit 1712 storing data generated during program execution.

The data storage unit 1712 stores data necessary for operation of an application program 1713.

The program storage unit 1711 includes the application program 1713. A program included in the program storage unit 1711 is a set of instructions.

The application program 1713 includes an application program operating in the AR and CDN. That is, the application program 1713 includes an instruction of an application driven by the processor 1722. The application program 1713 also includes a program for performing operations of the AR and CDN as shown and described with reference to FIG. 1 to FIG. 15 hereinabove.

The memory interface 1721 controls the access of constituent elements, such as the processor 1722 or the peripheral interface 1723 to the memory 1710.

The peripheral interface 1723 controls the connection of the processor 1722 and the memory interface 1721 with an input output interface device.

The processor 1722 controls the AR and CDN to provide a corresponding service using at least one software program. At this time, the processor 1722 executes at least one program stored in the memory 1710 and provides a service corresponding to the corresponding program.

The input output control unit 1740 provides an interface between the peripheral interface 1723 and an input output device such as the display unit 1750, the input device 1760 and the like.

The display unit 1750 displays status information, an input character, a moving picture, a still picture and the like. For example, the display unit 1750 displays information of an application program driven by the processor 1722.

The input device 1760 provides input data generated by selection of the AR and CDN, to the processor unit 1720 through the input output control unit 1740. At this time, the input device 1760 includes a keypad including at least one hardware button, a touch pad sensing touch information, and the like. For example, the input device 1760 provides touch information such as a touch, a touch motion, a touch release and the like, which are sensed through the touch pad, to the processor 1722 through the input output control unit 1740.

The AR and CDN include a communication processing unit 1790 performing a communication function for data communication.

According to the aforementioned embodiments of the present invention, there is an advantage in which, although performing handover, an electronic device maintains a transmission path with the closest content server without disconnection of a session, thereby guaranteeing an optimal transmission path. Also, according to embodiments of the present invention, a time delay for contents transmission is advantageously minimized, and an amount of traffic going through a core network and an access network is reduced, thereby saving CApital EXpense/OPerating EXpense (CAPEX/OPEX).

A computer-readable recording medium according to an embodiment of the present invention may record a program instruction for performing an operation implemented by various computers in accordance to an embodiment of the present invention. Such a computer-readable recording medium may include a program instruction, a data file, a data structure and the like singly or in combination. Such program instructions may include a combination instructions specially designed and constructed for the present invention. The computer-readable recording medium may include a magnetic medium such as a hard disk, a floppy disk, and a magnetic tape, an optical medium such as a Compact Disc-Read Only Memory (CD-ROM) and a Digital Versatile Disc (DVD), a Magneto-Optical Medium such as a floptical disk, and a hardware device specially configured to store and perform an application instruction (e.g., the programming module) such as a Read Only Memory (ROM), a Random Access Memory (RAM), a flash memory and the like. Also, the application instruction may include, not only a mechanical code such as a code made by a compiler, but also a high-level language code executable by a computer using an interpreter and the like. When all or some of a base station or a relay described in the present invention is implemented by a computer program, even the computer-readable recording medium storing the computer program is included in accordance with embodiments of the present invention. Therefore, the spirit and scope of the present invention is limited to the described embodiments, but is defined by the appended claims and their equivalents.

While the invention has been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. A method for operating an electronic device in a wireless communication system, the method comprising:
   receiving, from a first content server, a first part of content up to a resuming point of the content via a source base station (BS) by using an internet protocol (IP) address of the first content server;
   performing a handover from the source BS to a target BS; and
   receiving, from a second content server, a second part of the content from the resuming point of the content via the target BS based on information for a session between the electronic device and the first content server, the information indicating the resuming point of the content,
   wherein the second part of the content is transmitted via the target BS by using the IP address of the first content server, and
   wherein the information is transmitted from the first content server to the second content server.

2. The method of claim 1, wherein the second part of the content is transmitted via a new session between the second content server and the electronic device, and
   wherein the new session is generated based on the information for the session comprising the IP address of the first content server, to resume downloading of the content.

3. The method of claim 1, wherein the first content server receives a request for providing the information for the session to the second content server, and
   wherein the information for the session comprises a value indicating the resuming point of the content, an identifier of the content, the IP address of the first content server, and an IP address of the electronic device.

4. The method of claim 1, wherein the second part of the content via the target BS is transmitted to the electronic device by using network address translation (NAT) between the second content server and the target BS.

5. The method of claim 1, wherein the second part of the content via the target BS is transmitted by using tunneling between the second content server and either the target BS or the electronic device.

6. The method of claim 1, wherein the second part of the content via the target BS is transmitted by using a multi-path transmission control protocol and an IP address of the second content server.

7. The method of claim 1, further comprising:
   receiving, from a domain name system server, information indicating the second content server which is adjacent to the electronic device after the handover.

8. An apparatus of an electronic device in a wireless communication system, the apparatus comprising:
   at least one transceiver; and
   at least one processor operatively coupled to the at least one transceiver,
   wherein the at least one processor:
   receives, from a content server, a first part of content up to a resuming point of the content via a source base station (BS) by using an internet protocol (IP) address of the first content server;
   performs a handover from the source BS to a target BS; and
   receives, from a second content server, a second part of the content from the resuming point of the content via the target BS based on information for a session between the electronic device and the first content server, the information indicating the resuming point of the content,
   wherein the second part of the content is transmitted via the target BS by using the IP address of the first content server, and
   wherein the information is transmitted from the first content server to the second content server.

9. The apparatus of claim 8, wherein the second part of the content is transmitted via a new session between the second content server and the electronic device, and wherein the new session is generated based on the information for the session comprising the IP address of the first content server, to resume downloading of the content.

10. The apparatus of claim 8, wherein the first content server receives a request for providing the information for the session to the second content server, and wherein the information for the session comprises a value indicating the resuming point of the content, an identifier of the content, the IP address of the first content server, and an IP address of the electronic device.

11. The apparatus of claim 8, wherein the second part of the content via the target BS is transmitted to the electronic device by using network address translation (NAT) between the second content server and the target BS.

12. The apparatus of claim 8, wherein the second part of the content via the target BS is transmitted by using tunneling between the second content server and either the target BS or the electronic device.

13. The apparatus of claim 8, wherein the second part of the content via the target BS is transmitted by using a multi-path transmission control protocol and an IP address of the second content server.

14. The apparatus of claim 8, wherein the at least one processor further receives, from a domain name system server, information indicating the second content server which is adjacent to the electronic device after the handover.

* * * * *